Figure 1:
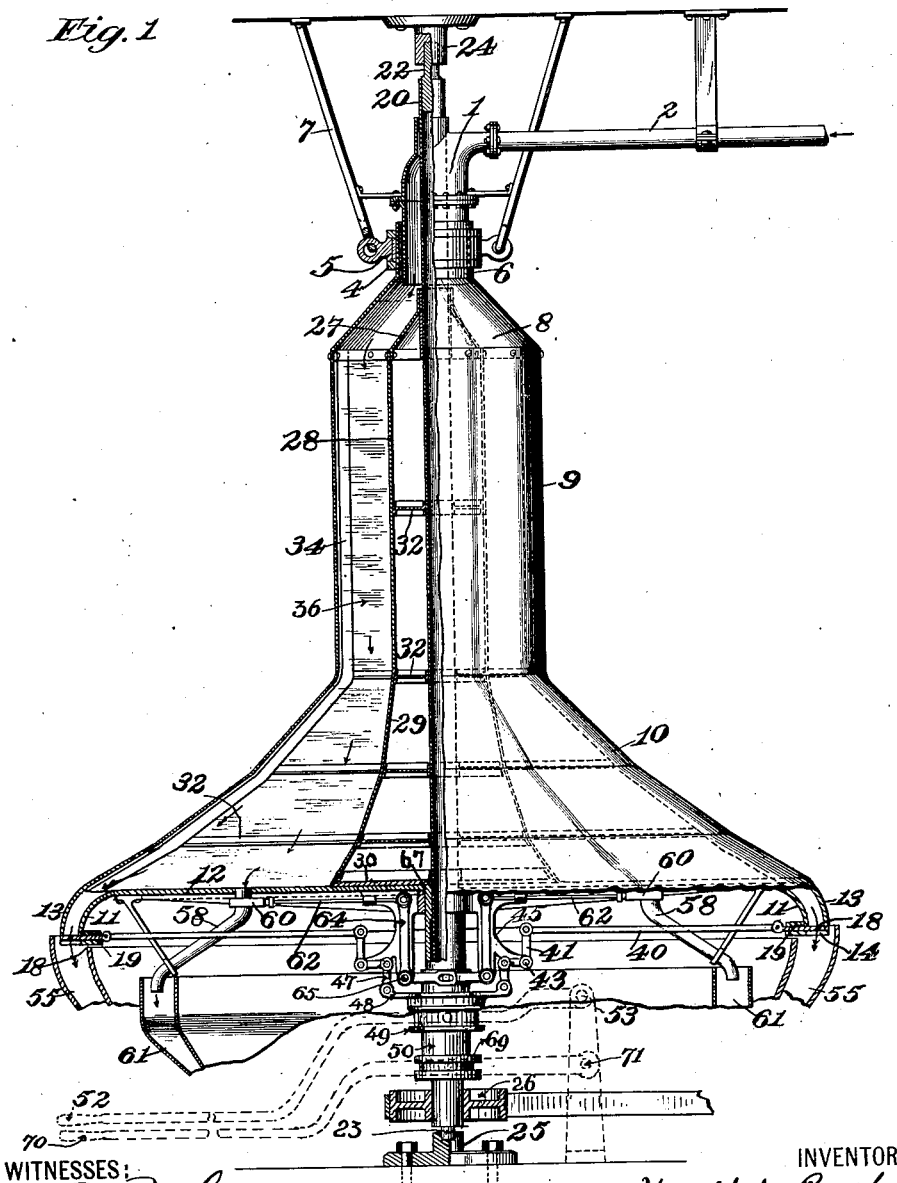

No. 648,711. Patented May 1, 1900.
H. DE RAASLOFF.
CENTRIFUGAL SEPARATOR FOR ORES.
(Application filed Jan. 18, 1900.)

(No Model.) 3 Sheets—Sheet 1.

WITNESSES: Geo. B Rowley. Henry V. Brown.

INVENTOR
Harald de Raasloff,
BY D. Walter Brown,
his ATTORNEY

No. 648,711. Patented May 1, 1900.
H. DE RAASLOFF.
CENTRIFUGAL SEPARATOR FOR ORES.
(Application filed Jan. 18, 1900.)
(No Model.) 3 Sheets—Sheet 2.
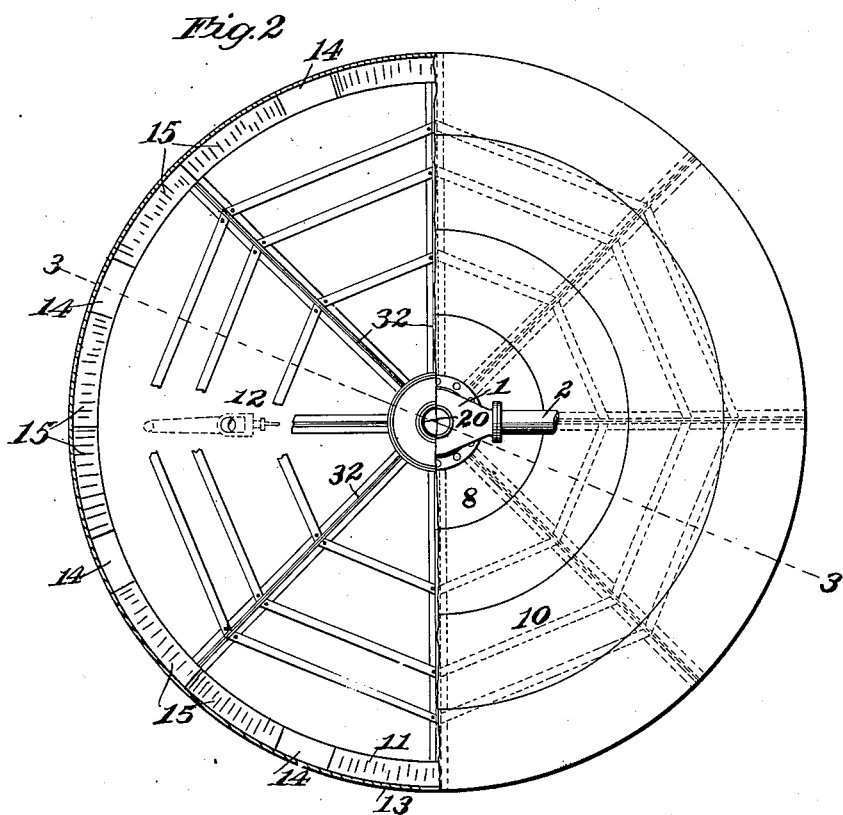
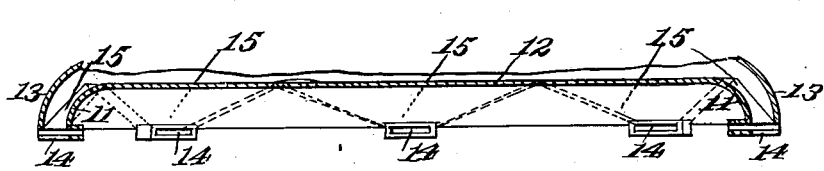
WITNESSES:
Geo. B. Rowley.
Henry V. Brown
INVENTOR
Harald de Raasloff
BY
D. Walter Brown
his ATTORNEY

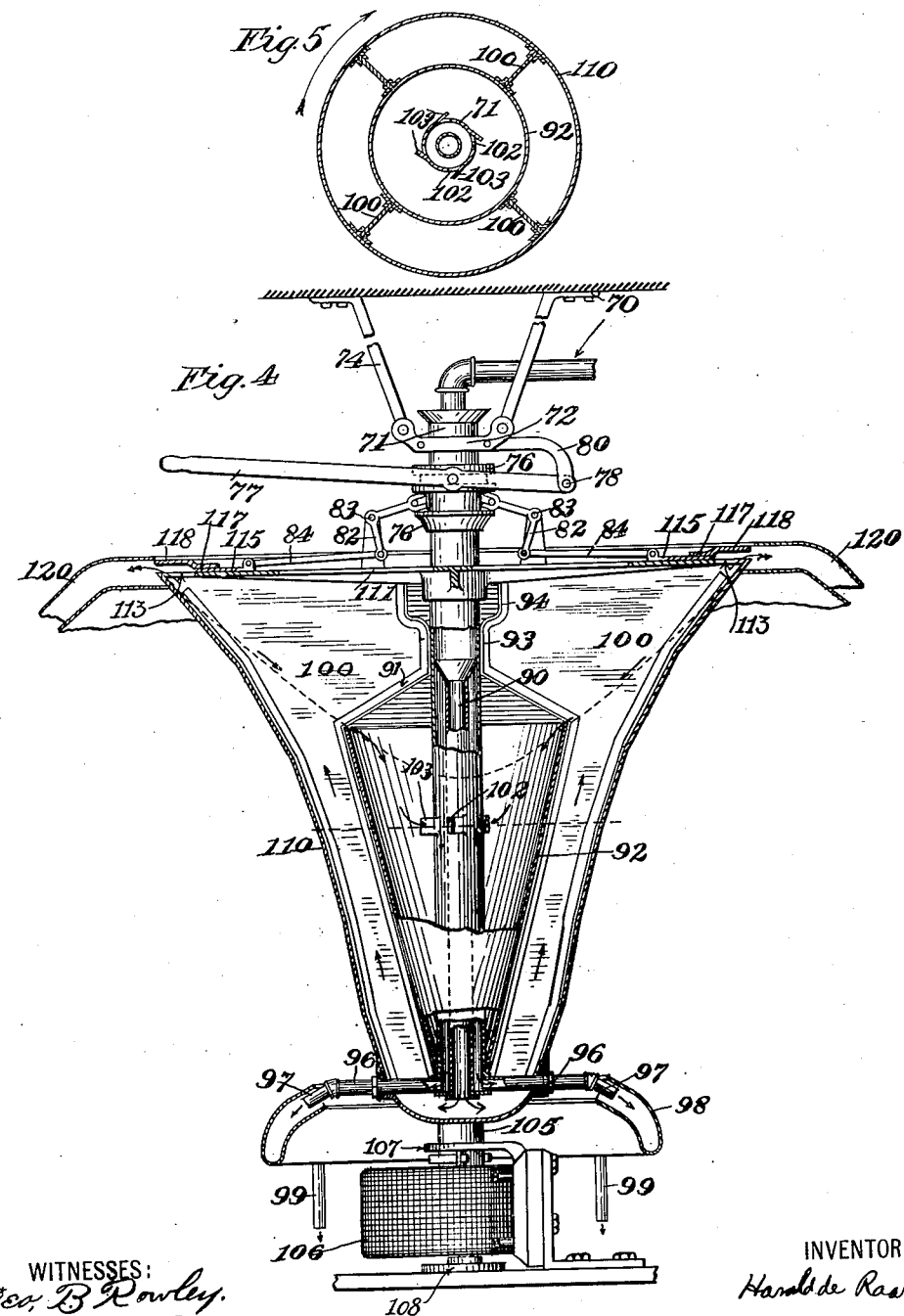

UNITED STATES PATENT OFFICE.

HARALD DE RAASLOFF, OF NEW YORK, N. Y.

CENTRIFUGAL SEPARATOR FOR ORES.

SPECIFICATION forming part of Letters Patent No. 648,711, dated May 1, 1900.

Application filed January 18, 1900. Serial No. 1,835. (No model.)

*To all whom it may concern:*

Be it known that I, HARALD DE RAASLOFF, a citizen of the United States, residing at the borough of Manhattan, in the city of New York, county and State of New York, have invented certain new and useful Improvements in Centrifugal Separators for Ores, of which the following is a specification.

This invention relates to improvements in centrifugal separators for ores, and especially such as are used for separating the solutions containing precious minerals from base mineral earthy matter. In particular it relates to improvements in centrifugal separators for use in the continuous process of separating precious metals from their ores which are described and claimed in my application for Letters Patent of the United States filed January 18, 1900, Serial No. 1,836.

The purpose of the invention is to produce a centrifugal separator wherein there will be a gradual concentration of the base solid matters as those matters pass from the inlet to the point of discharge and also wherein the degree of such concentration can be controlled at will by the operator. To this end the device is so constructed as to cause the base matters to separate from the solution and to fly toward the shell of the filter in such direction with respect to said shell that there shall be a resultant of the centrifugal force substantially parallel to the shell, which resultant shall be sufficient to overcome the adhesion and friction of the base matters on the shell and move the said base matters to their point of discharge, and the shell is so shaped as to increase this resultant as the base matters concentrate and become denser, so that the increasing resultant shall compensate for the increasing adhesion and friction of the denser base matters on the shell. The base matters thus travel along the shell and are drawn off at suitable outlets near the periphery of the separator, while the solution, being of less specific gravity, is drawn off through separate orifices nearer the center of the filter.

Referring to the drawings which accompany the specification to aid the description, Figure 1 is an elevation of the centrifugal separator with one-half of the shell broken away to show the deflector and blades. Fig. 2 is a top view of the same. Fig. 3 is a transverse section projected vertically on the plane of the line 3 3 of Fig. 2 of the lower part of the shell, showing the pockets and discharge-outlets, the valves being removed. Fig. 4 is a sectional elevation of a modification wherein the filter is arranged with the large end up, Fig. 5 being a horizontal section midway of the height of Fig. 4.

In that form of the device shown in Figs. 1 to 3, inclusive, 1 is a stationary hood fastened in any suitable manner to a stationary support, 2 being the inlet-pipe, which delivers the "pulp"—*i. e.*, the mixed base matters and solution containing the dissolved precious minerals, especially gold—into said hood 1. For convenience said hood is preferably made in two parts flanged together, as shown. The double-flanged collar 4 is fastened on the neck 6 of the filter-shell, fits loosely over said hood 1, and turns in the bushing 5, which is fixed to any suitable hangers or supports 7. The shell of the centrifugal separator is preferably formed of sheet metal and with the conical frustum 8 flaring downwardly and outwardly from said neck 6, the cylinder 9, and the downwardly and outwardly flaring frustum 10, which is closed at the bottom by the plate 12. Said frustum has an outwardly-concave curve, or the frustum is made in several sections, the flare of the lower being greater than that of the upper sections, as shown, so that the increase of the resultant of the centrifugal force parallel to the slope shall compensate for the increasing density of the concentrating base-matters sludge as the sludge approaches the point of discharge, and so keep the sludge moving along the shell. Said bottom 12 has the downwardly-curved flange 11 positioned a short distance within and concentric to the rim 13 of the shell and is provided with pockets 15, at the bottom of each of which are the outlets 14, controlled by the valves 18 in the manner hereinafter described. An axial spindle 20 extends through and some distance above and below the shell and is preferably made of strong tubing with studs 22 23, which turn in bearings 24 25. Said spindle is rotated by the pulley 26 and belt from suitable motor or in any suitable manner. A deflector comprising a conical top 27 and preferably, but not necessarily, a cylinder 28 and flaring lower portion 29, with bottom 30, is fixed to the spindle 20 by radial arms 32, to the outer ends of which are also fastened the flanges 34 of the shell. Blades 36, arranged midway of the outlets 14, are fastened to said arms 32 to cause the pulp to revolve at the same velocity as the shell. Each of said valves 18 works rectilinearly in guides 19 and is shifted by the connecting-rod 40, which is pivotally connected at its inner end with the bent lever 41, pivoted at 43 in hangers 45, which are fixed under the plate 12. The other end of each said bent lever 41 is connected by links 47 with the flange 48 of the collar 49, which works on the sleeve 50. A lever 52, pivoted at 53, engages said collar 49 in the usual manner and by raising said collar closes said valves, while the lowering of said lever and collar opens the valves.

A stationary annular trough 55 is positioned to receive the discharge from the outlets 14, and said trough delivers the waste matters into any suitable receptacle.

Intermediate the periphery of the frustum 10 and the deflector 28 pipes 58, controlled by valves 60, open through the bottom 12, said pipes 58 discharging into the annular trough 61, from which the solution is drawn or flows continuously to be treated in the succeeding steps of the process. The valve-rods 62 are pivotally connected at their inner ends with one arm of the bent levers 64, which are pivoted at 65 to the said hangers 45. The other arm of said levers 64 has a slot-and-pin connection with said sleeve 50, which is feathered to slide on the spindle 20 or the sleeve 67 of the plate 12, as convenience dictates. A collar 69, fixed on sleeve 50, is engaged in the usual manner with the lever 70, which is pivoted at 71, so that by raising said lever 70 all the valves 60 are closed and by lowering said lever all said valves are opened.

The construction hereinbefore described permits of readily opening and closing the valves 18 60 when the device is revolving and without interfering with the continuity of the process.

The operation is as follows: The pulp entering from pipe 2 and falling through hood 1 into the pulp which fills the filter to a point just below the hood reaches the cylinder 9 at a point sufficiently out from the center to be energetically acted on by the centrifugal force, the blades 36 immediately imparting to the pulp the same velocity of rotation as the shell has. The separation of the base matters begins at once, and said cylinder 9 is preferably of such length that said base matters shall just begin to concentrate on the shell when they reach the upper end of the frustum 10. Now the resultant of the centrifugal force, which is parallel to the slope of the frustum, causes the increasingly-denser accumulation of base matters to move along the shell and into said pockets 15. The degree of concentration is from time to time observed by opening the valves 18 and allowing a little of the solid matters to flow out. When the desired concentration is reached, the valves 18 are opened and left open, the solid matters now flowing continuously from the centrifugal separator into the trough 55. As soon as the valves 18 are finally opened valves 60 are also opened, and the solution containing the dissolved gold separated from the base matters flows continuously into the trough 61 and goes thence through the other steps of the process, returning when recharged again and again to the separator-filter, as described in my other application.

Referring to the modification shown in Figs. 4 and 5, the delivery-pipe 73 discharges into the funnel-pipe 75, which is extended downward to near the lower end of the shell of the centrifugal separator, as shown. An inner pipe 90, with a funnel end, which fits water-tight in the pipe 75, discharges the pulp near the bottom of the shell 110. Said shell 110 is arranged with the large end up and is formed on an outwardly-concave flare or in sections, each of which has a greater outward flare than the next lower section. The point of discharge of the solid matters is now at the upper end of the shell, and thus the modification embodies the same principle as the other form of the device—i. e., the shell is so constructed that there shall be an increasing resultant of the centrifugal force parallel to the slope of the shell to compensate for the greater density and adhesiveness and friction of the solid matters as they move toward the point of discharge. Also in both forms of the apparatus the pulp enters one end of the shell and the solid matters discharge at the other end, so that the movement of the solid matters is not interfered with by the main flow of the pulp in the apparatus, being in the opposite direction, as it would be if the pulp entered the shell at the end where the sludge was discharged. The ribbed cover-plate 111 of said shell has orifices 113, controlled by valves 115, reciprocating between the plate 111 and the guide-flanges 117 of the nozzles 118, said nozzles discharging into the annular trough or vessel 120, whence the sludge is drawn into any suitable receptacle. Said valves 117 are connected by rods 84 with one end of the bent levers 82, which are pivoted at 83 in brackets carried by plate 111. The other ends of said levers 82 are pivotally connected with the collar 76, which slides on pipe 75. A lever 77, pivoted at 78 in the bracket 80, engages said collar 76 in the usual manner, so that by raising said lever the valves 117 are opened and by lowering it said valves are closed. Said bracket 80 may be carried by the bushing 72, which constitutes a bearing for the pipe 75 and is supported by suitable hangers 74. A deflector 92, provided with an open grid top of angle-irons 91, bent inward at 93 and outward and upward at 94, so as to be fastened to the pipe 75 and plate 111, fits tight against said pipe 75 at its lower end and is firmly fastened to said pipe. Just below the bottom of said deflector, but above the bottom of the shell 110, said pipe 75 connects with cross-tubes 96, which terminate in nozzles 97, that deliver the solution into the annular vessel 98, whence it flows by pipes 99 to be treated by other steps of the process, again returning when recharged to the separator-filter. Blades 100, arranged midway of the pipes 96, are fastened at their outer edges to flanges or angle-irons of the shell and at their inner edges to the angle-irons 91 of the deflector, and said blades 100 extend from the plate 111 to about the tubes 96. At a point on the pipe 75 below the level which the pulp assumes orifices 102 are made into said pipe and the metal of said pipe bent to form tongues 103, as shown. As the shell revolves in the direction of the arrow, Fig. 5, said tongues 103 force the solution into pipe 75, whence it flows by tubes 96, as before stated. A spindle 105, fixed to the bottom of the shell 110, is revolved in any suitable manner, as by the electric motor 106. A bushing 107, carried by the standard of the motor, serves as a guide-bearing for said spindle 105, the armature of the motor or the spindle being stepped in a block 108.

The operation is as follows: The pulp, flowing into the pipe 75, is discharged into the bottom of the centrifugal separator and then flows outwardly and upwardly, being revolved by the blades 100. The base solid matters now begin to separate and concentrate on the shell, the increasing resultant of the centrifugal force parallel to the slope of the shell moving said matters to the point of discharge. When the proper degree of concentration of the sludge is attained, the valves 117 are opened and left open and the solid matters flow continuously from the centrifugal separator into the vessel 120. Meantime the lighter solution, containing the dissolved gold, enters the open top of the deflector 92, this open top being at about the estimated level of the pulp, and the solution flowing from the deflector into the pipe 75 by the orifices 102 finally issues in a continuous stream from the nozzles 97. Should the operator cease to add pulp, the level in the deflector 92 will fall just below the orifices 102 and the discharge of the solution will cease. The solid matters, however, will continue to be discharged as long as any separation by these means is possible.

I can of course form the lower part of the shell 110 as a cylinder similar to the upper part of the shell in Fig. 1; but the cylinder is not essential in either case.

Now, having described my improvements, I claim as my invention—

1. In a centrifugal separator the combination of a shell, an inlet at one end and an outlet at the other end of such shell for solid matters, and said shell being formed with an increasing outward flare toward the said outlet, whereby the resultant of the centrifugal force parallel to said shell is progressively increased toward said outlet, substantially as described.

2. In a centrifugal separator, the combination of a shell having a progressively-increasing outward flare toward the point of discharge of the solid matters, an inlet at one end and an outlet for solid matters at the other end thereof, outlets for the liquids separate from the outlets for solid matters, and blades in said shell adapted to impart rotation to the contents thereof, substantially as described.

3. The combination in a centrifugal separator of a shell having a progressively-increasing outward flare toward the point of discharge of the solid matters, an inlet at one end and an outlet for the solid matters at the other end of said shell, a deflector in said shell, blades between said deflector and said shell, and outlets for the liquids separate from the outlets for said solid matters, substantially as described.

4. The combination in a centrifugal separator, of a shell having a progressively-increasing outward flare toward the point of discharge, an inlet at one end and a discharge for the solid matters at the other end, valves controlling the discharge of said solid matters, and a lever operatively connected with said valves by a rotatable connection whereby the lever can throw the valves when the shell is revolving, substantially as described.

5. The combination in a centrifugal separator of a shell formed with an increasing outward flare from the inlet to the discharge for the solid matters, and a deflector in said shell, adapted to direct the incoming matter out from the center of rotation, substantially as described.

6. The combination in a centrifugal separator of a shell formed with an increasing outward flare from the inlet to the discharge for the solid matters, a deflector to said shell and blades between said deflector and shell, substantially as described.

7. The combination in a centrifugal separator, of a shell provided with an inlet at one end and with a discharge for the solid matters at the other end of said shell, and said shell formed with an increasing outward flare toward said discharge, a separate discharge for the liquids, independent valves controlling said discharges, and independent means for actuating said valves having rotatable connection with their several valves, whereby the valves may be actuated when the shell is revolving, substantially as described.

8. In a centrifugal separator, a shell provided with an inlet and outlet, and said shell being formed with an increasing outward flare toward said outlet, whereby the resultant of the centrifugal force parallel to said shell is progressively increased toward said outlet, substantially as described.

In testimony whereof I have signed my name hereto, this 17th day of January, 1900, at New York, N. Y., in the presence of two witnesses.

HARALD DE RAASLOFF.

Witnesses:
HENRY V. BROWN,
ABM. VAN SANTVOORD.